Figure 6:
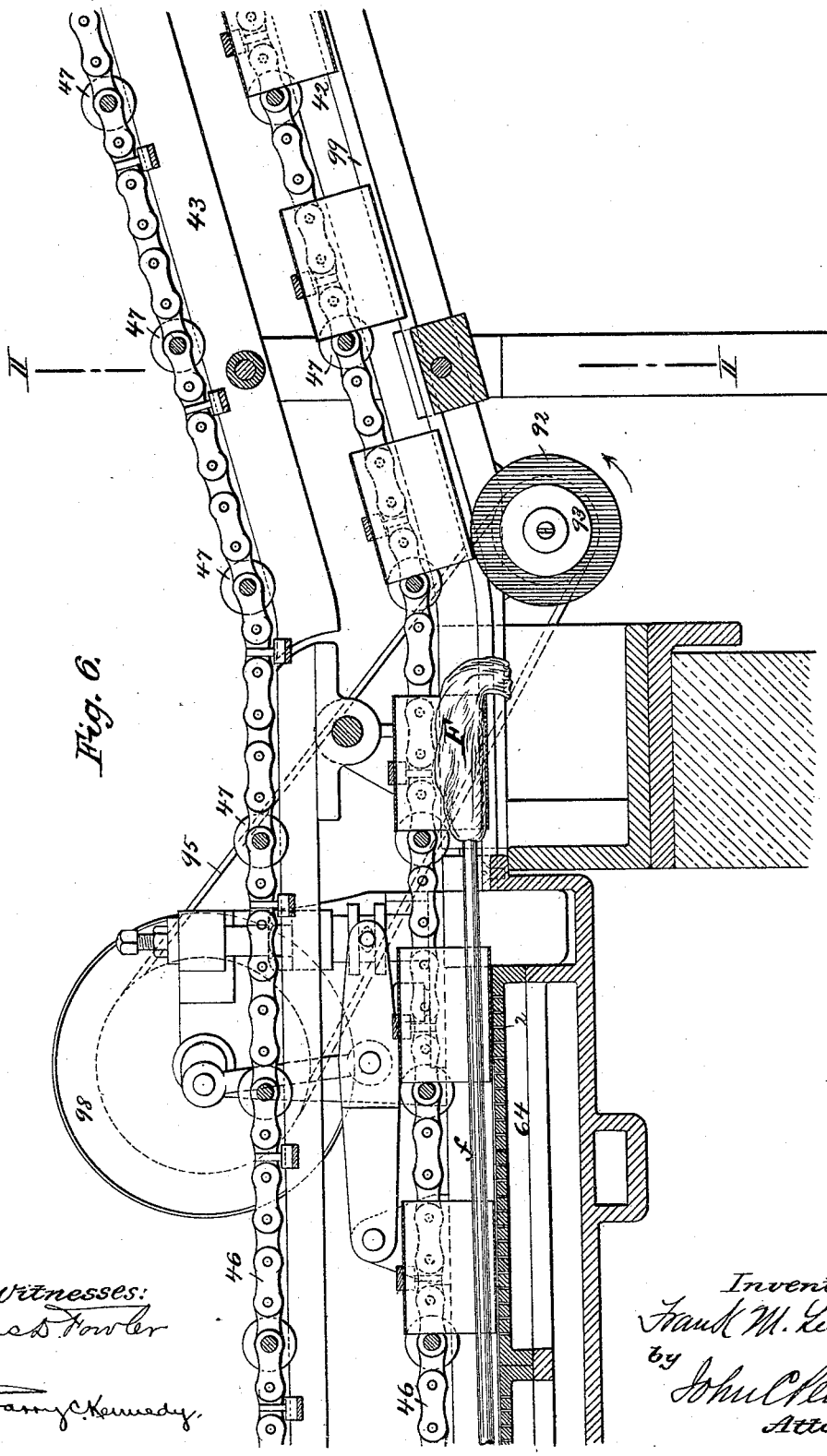

(No Model.) 13 Sheets—Sheet 1.
F. M. LEAVITT.
CAN BODY FORMING AND SIDE SEAM SOLDERING MACHINE.
No. 444,000. Patented Jan. 6, 1891.
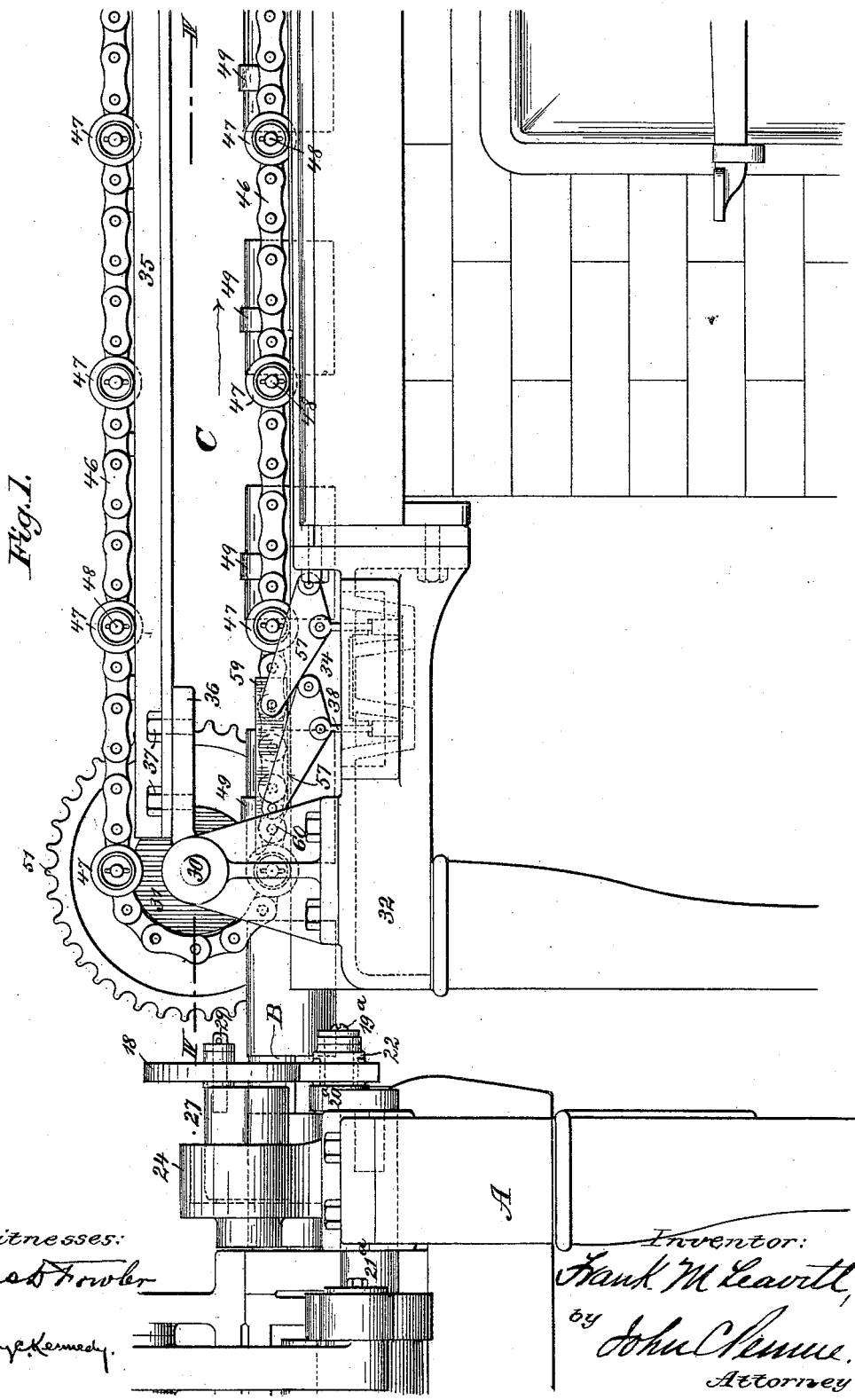

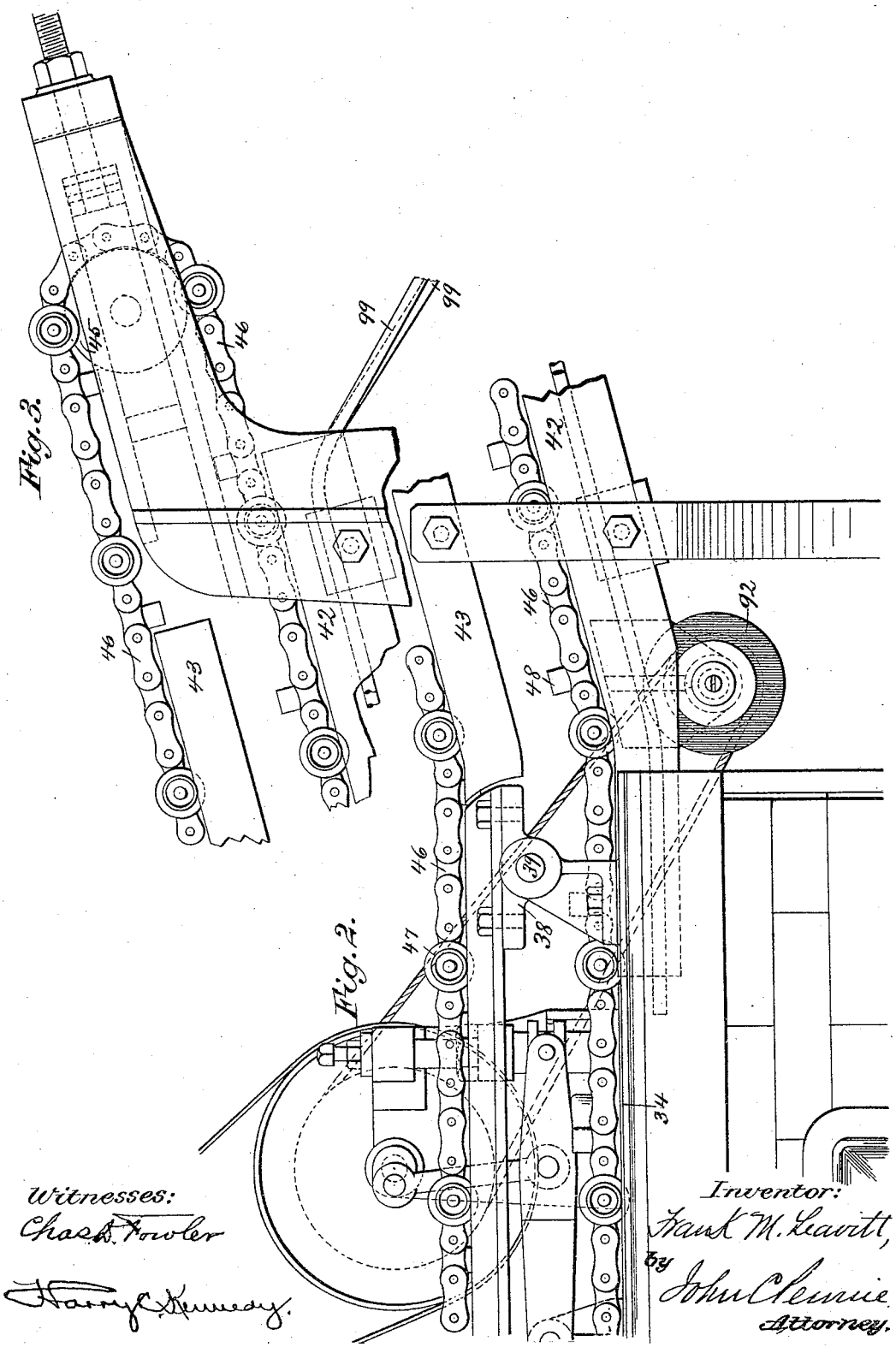

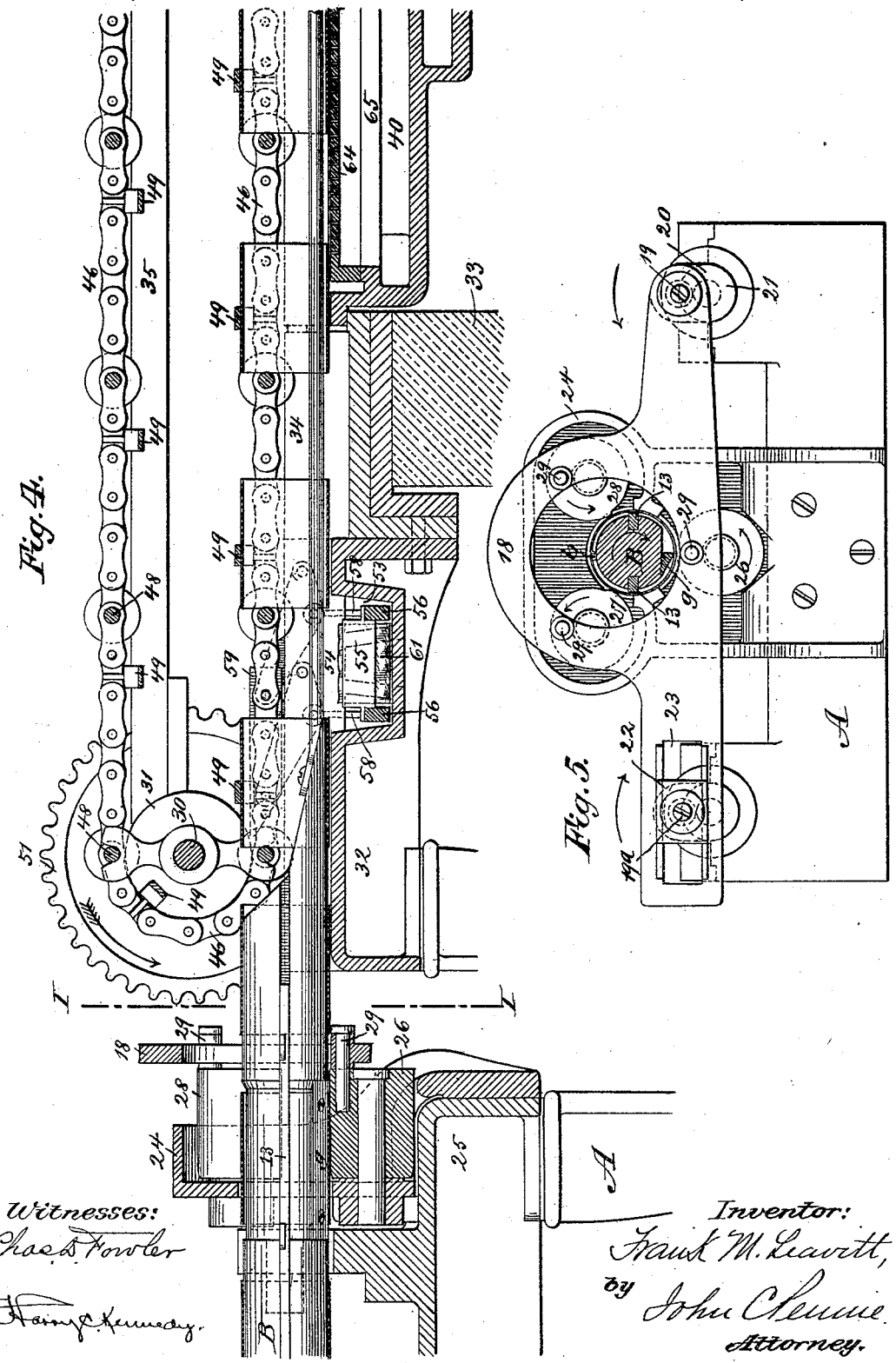

(No Model.) 13 Sheets—Sheet 4.

F. M. LEAVITT.
CAN BODY FORMING AND SIDE SEAM SOLDERING MACHINE.

No. 444,000. Patented Jan. 6, 1891.

Witnesses:
Chas. D. Fowler
Harry C. Kennedy.

Inventor:
Frank M. Leavitt,
by John C. Pennie
Attorney.

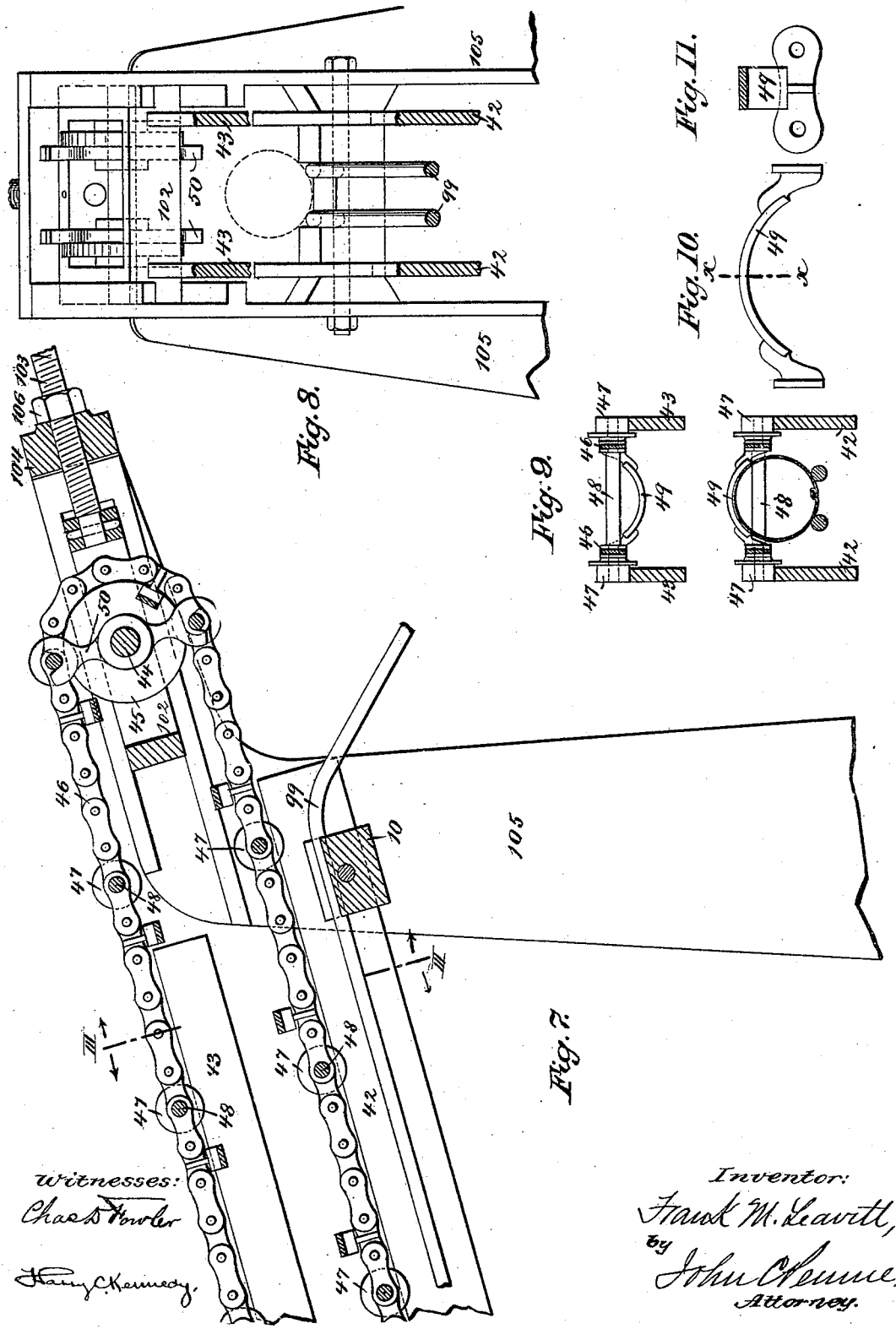

(No Model.) 13 Sheets—Sheet 6.
F. M. LEAVITT.
CAN BODY FORMING AND SIDE SEAM SOLDERING MACHINE.
No. 444,000. Patented Jan. 6, 1891.
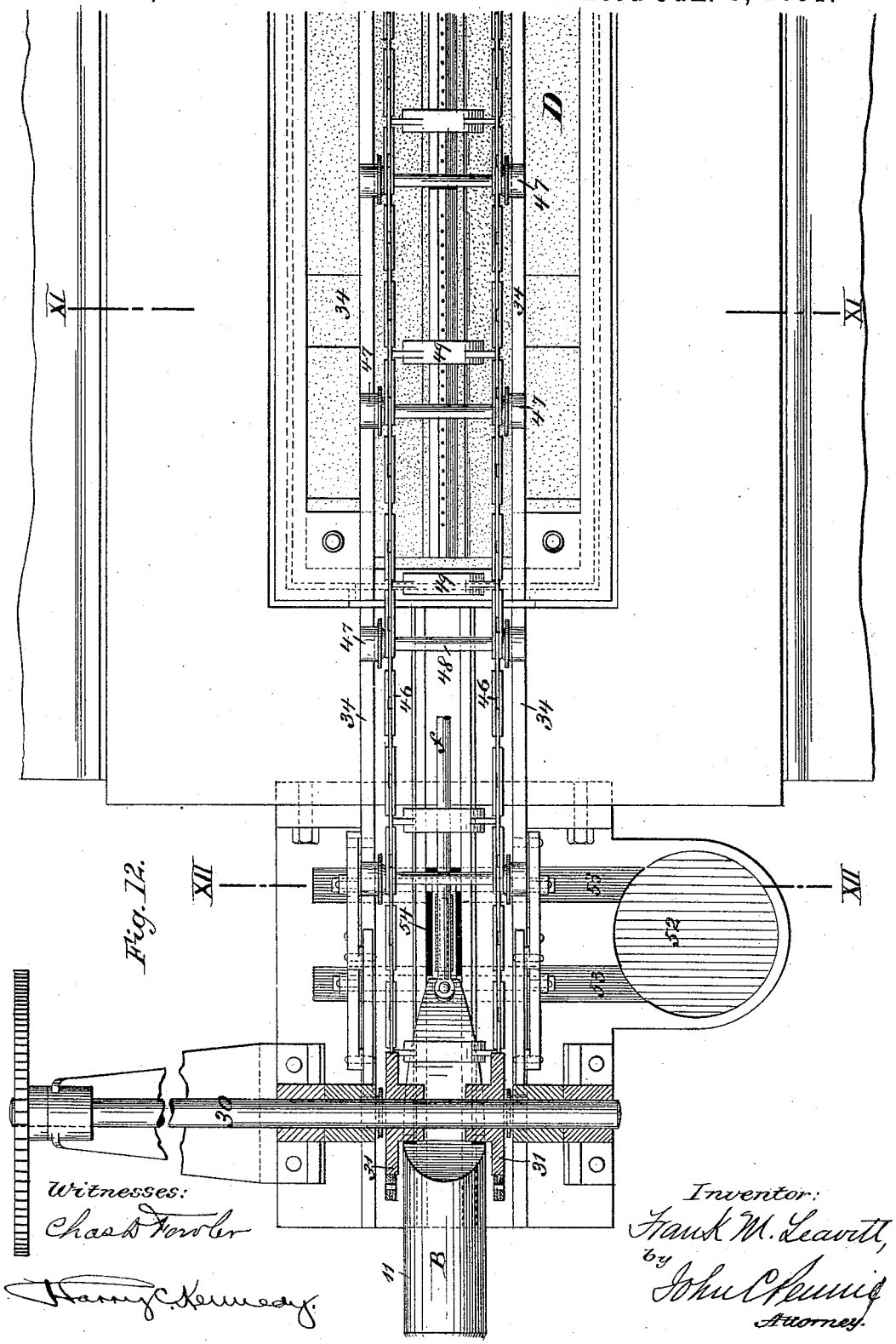

(No Model.) 13 Sheets—Sheet 7.
F. M. LEAVITT.
CAN BODY FORMING AND SIDE SEAM SOLDERING MACHINE.
No. 444,000. Patented Jan. 6, 1891.
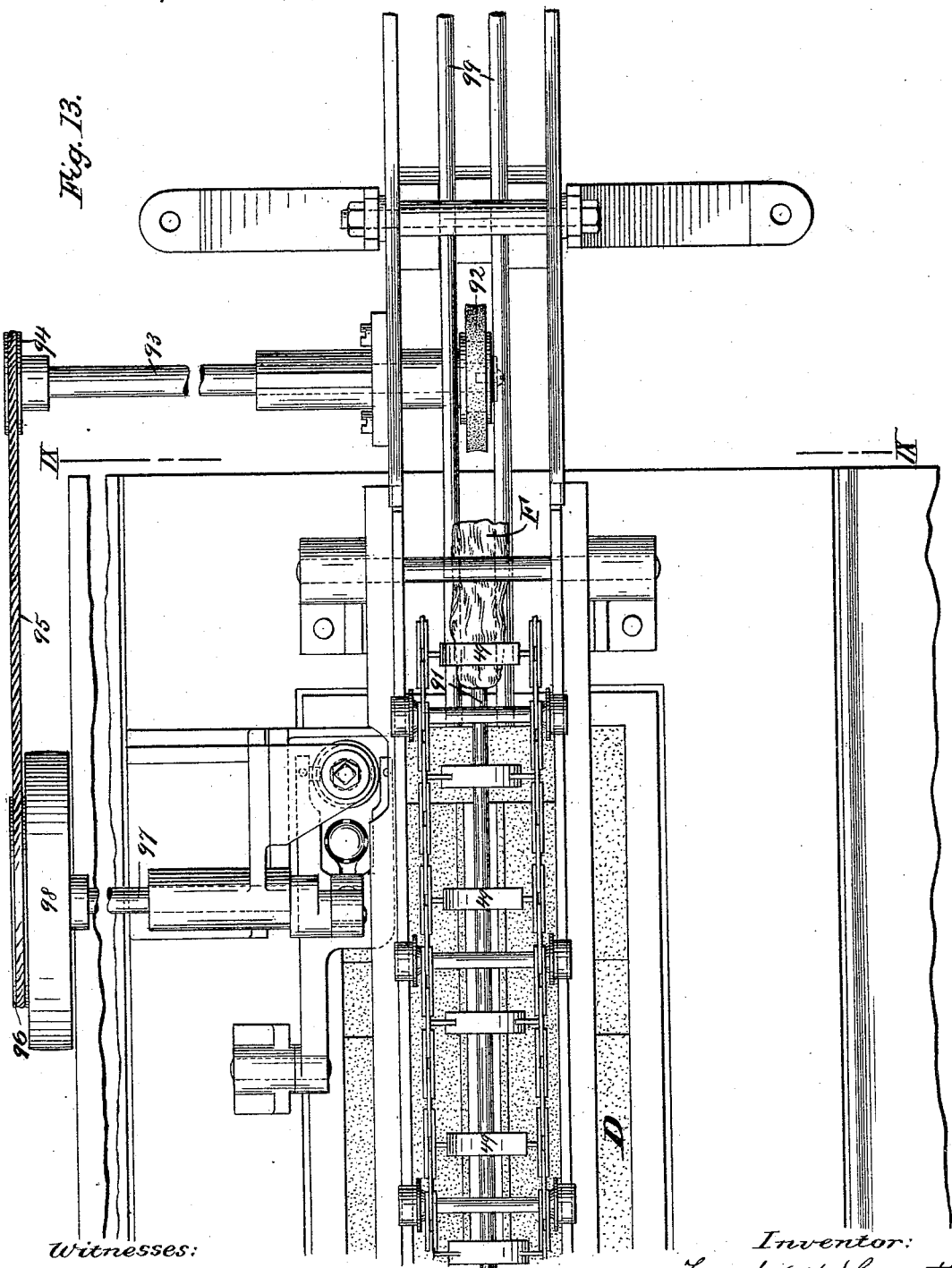
Witnesses:
Chas. D. Fowler
Harry C. Kennedy
Inventor:
Frank M. Leavitt,
by John C. Kennie
Attorney.

(No Model.) 13 Sheets—Sheet 8.
F. M. LEAVITT.
CAN BODY FORMING AND SIDE SEAM SOLDERING MACHINE.
No. 444,000. Patented Jan. 6, 1891.
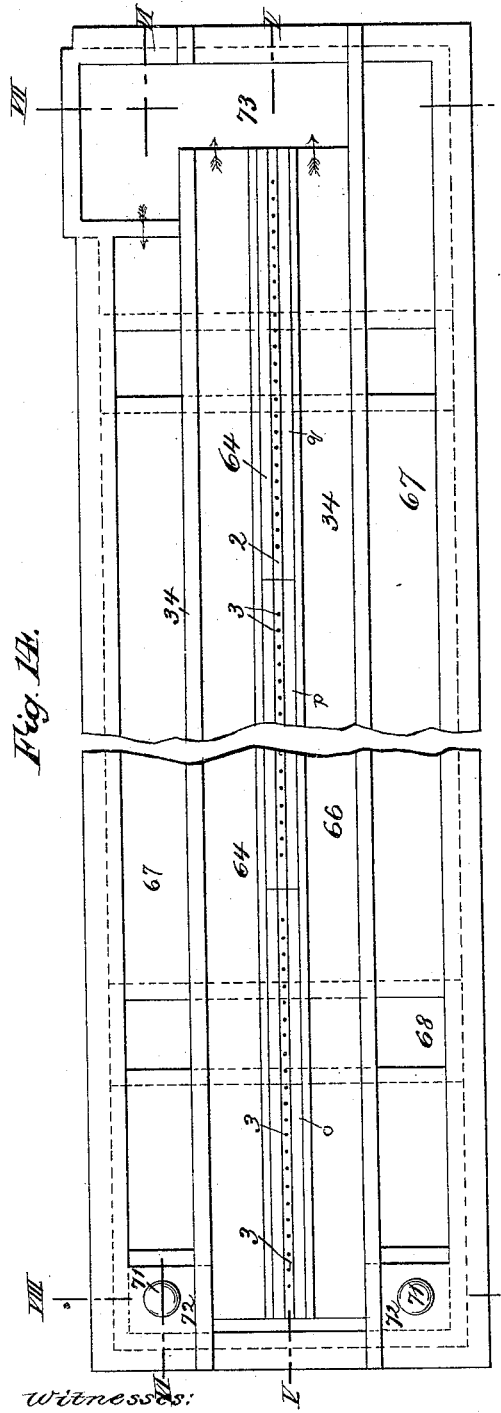
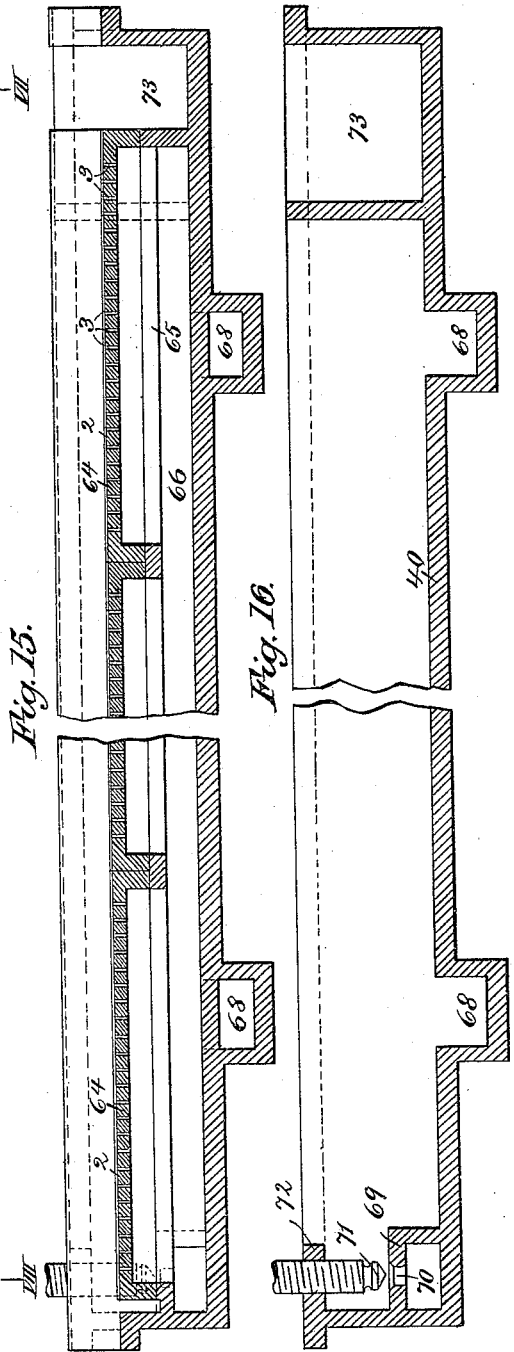
Witnesses:
Chas. F. Fowler
Harry C. Kennedy
Inventor:
Frank M. Leavitt
by John C. Kerr
Attorney.
THE NORRIS PETERS CO., PHOTO-LITHO., WASHINGTON, D. C.

(No Model.) 13 Sheets—Sheet 9.
F. M. LEAVITT.
CAN BODY FORMING AND SIDE SEAM SOLDERING MACHINE.
No. 444,000. Patented Jan. 6, 1891.
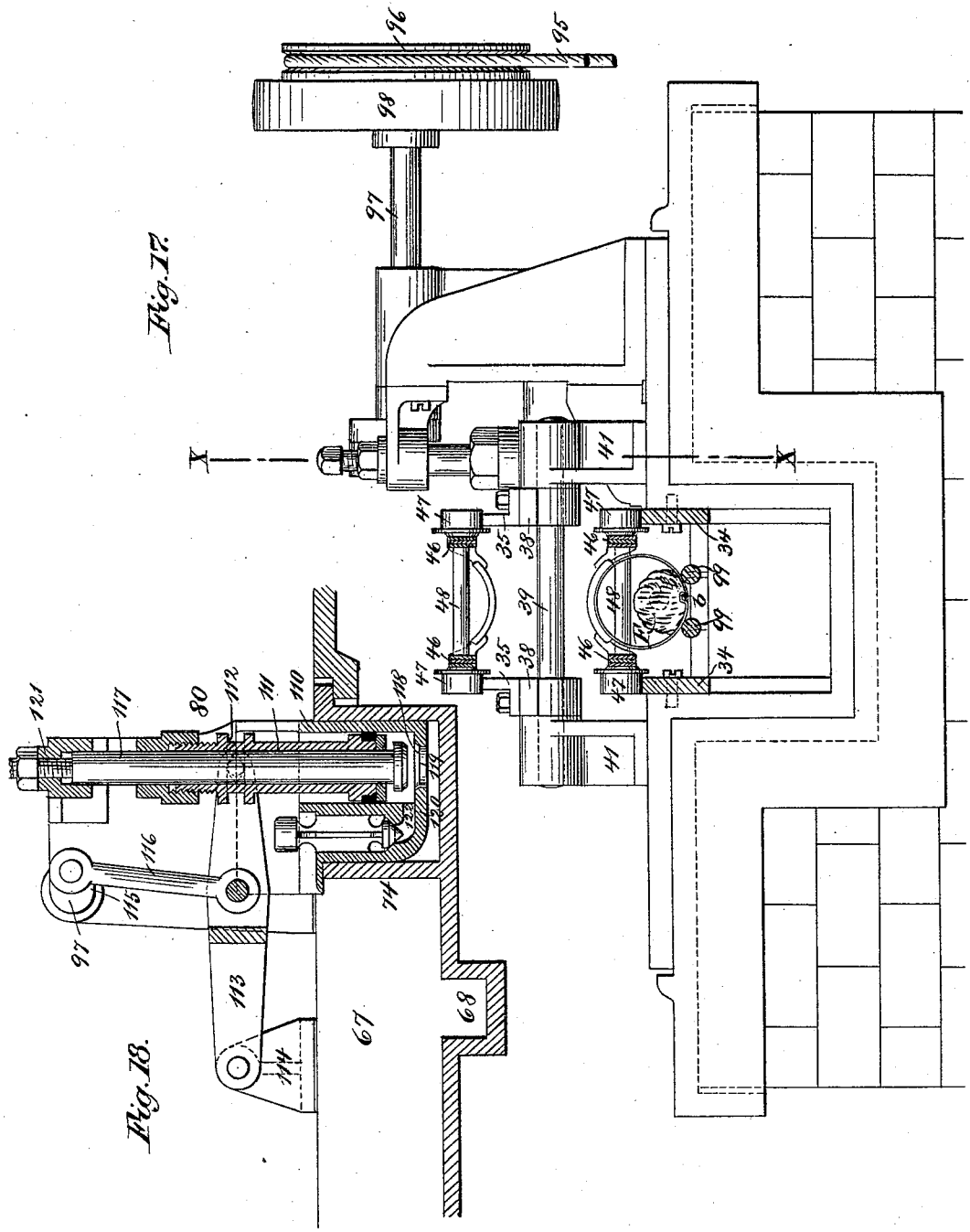
Witnesses:
Chas. D. Fowler
Harry C. Kennedy
Inventor:
Frank M. Leavitt,
by John C. Pennie
Attorney.

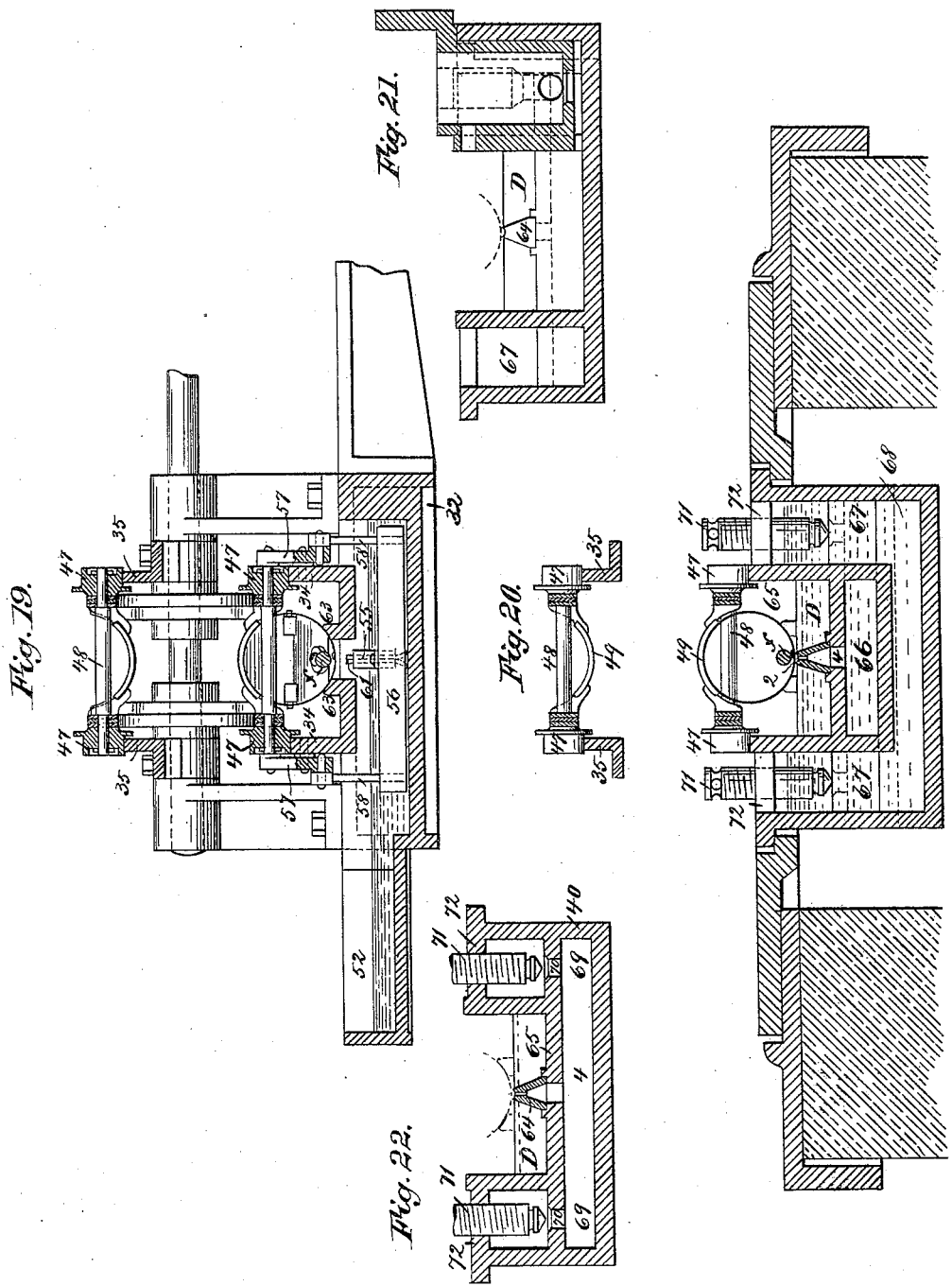

(No Model.) 13 Sheets—Sheet 11.
F. M. LEAVITT.
CAN BODY FORMING AND SIDE SEAM SOLDERING MACHINE.
No. 444,000. Patented Jan. 6, 1891.
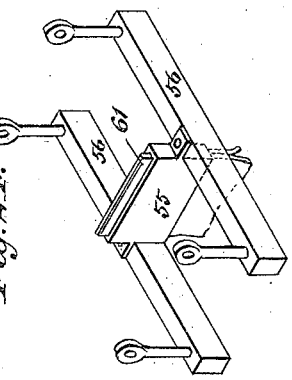
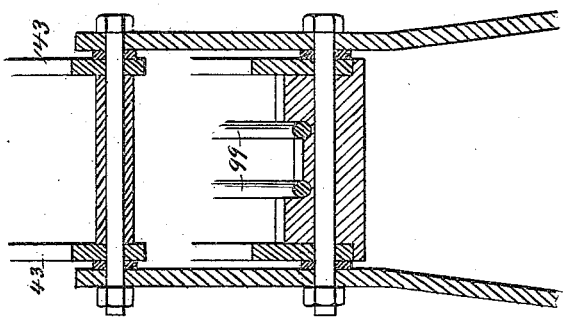
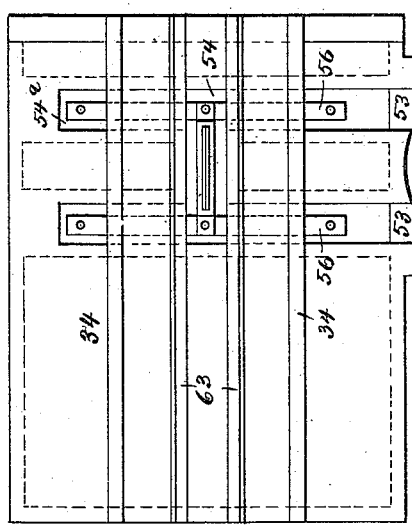
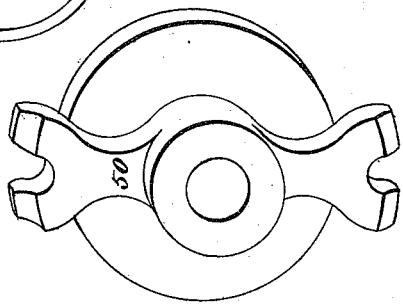

(No Model.) 13 Sheets—Sheet 12.
F. M. LEAVITT.
CAN BODY FORMING AND SIDE SEAM SOLDERING MACHINE.
No. 444,000. Patented Jan. 6, 1891.
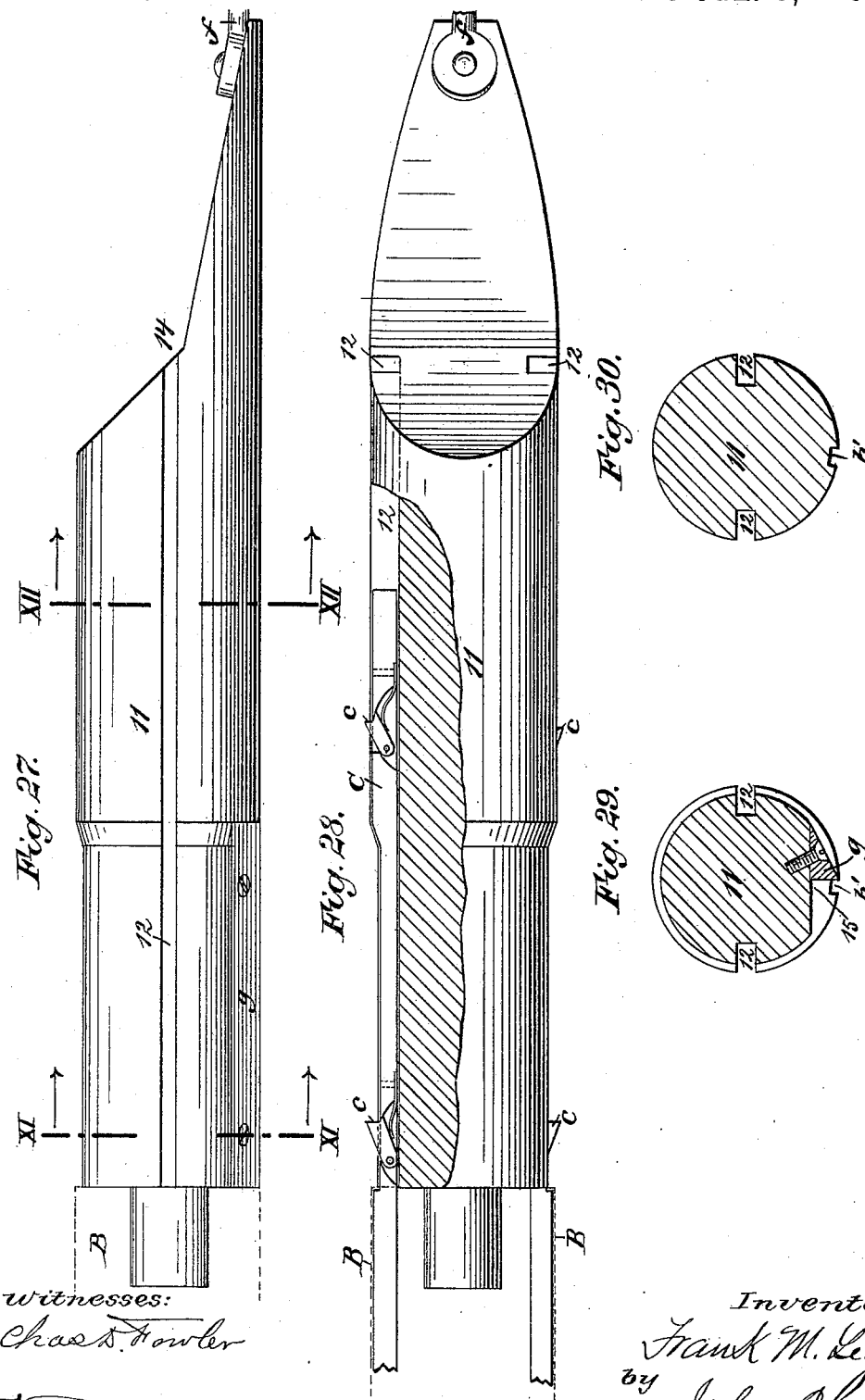

(No Model.)
F. M. LEAVITT.
CAN BODY FORMING AND SIDE SEAM SOLDERING MACHINE.
No. 444,000. Patented Jan. 6, 1891.
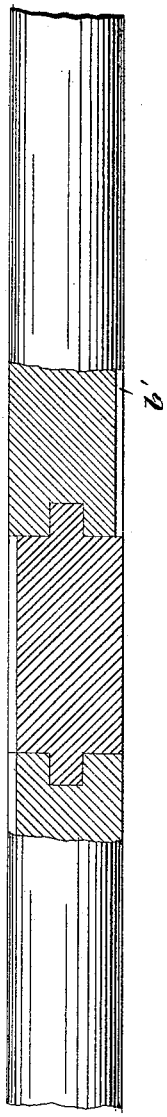
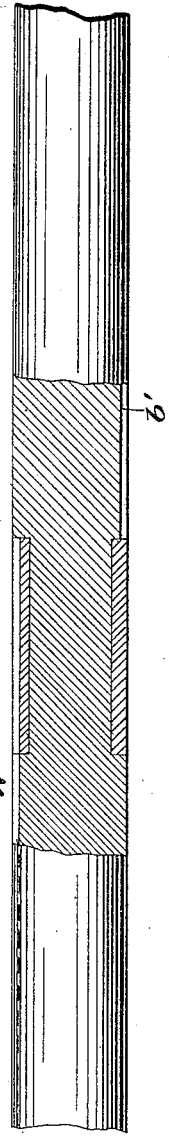
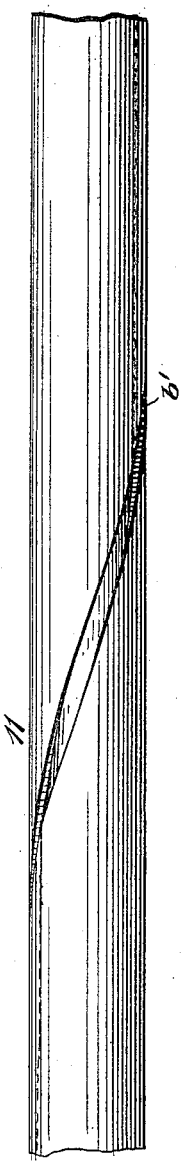

UNITED STATES PATENT OFFICE.

FRANK M. LEAVITT, OF BROOKLYN, NEW YORK, ASSIGNOR TO EDWIN NORTON AND OLIVER W. NORTON, BOTH OF CHICAGO, ILLINOIS.

CAN-BODY-FORMING AND SIDE-SEAM-SOLDERING MACHINE.

SPECIFICATION forming part of Letters Patent No. 444,000, dated January 6, 1891.

Application filed April 26, 1888. Serial No. 271,988. (No model.)

*To all whom it may concern:*

Be it known that I, FRANK M. LEAVITT, a citizen of the United States, residing at Brooklyn, in the county of Kings and State of New York, have invented certain new and useful Improvements in Can-Body-Forming and Side-Seam-Soldering Machines; and I do hereby declare the following to be a full, clear, and exact description of the invention, such as will enable others skilled in the art to which it appertains to make and use the same.

My invention relates to machines for making sheet-metal cans, and more particularly to a combined can-body-forming and side-seam-soldering machine.

Heretofore in the manufacture of sheet-metal cans it has been customary to form the can-bodies with interlocked side seams on machines known as "body-forming machines"—such, for example, as are shown and described in Patent No. 250,266, to me, of November 29, 1881, or in Patent No. 303,837, to Gordon, of August 19, 1884, or in Patent No. 310,895, to Jordan, of January 20, 1885—and then by hand or otherwise deliver the can-bodies into side-seam-soldering machines—such, for example, as that shown and described in Patent No. 250,096, to Norton, of November 29, 1881. To properly solder the side seam of the can, whether the soldering be done by a solder bath or by a soldering-iron, it is essential that the can be turned or held during the soldering operation with its seam downward, because if the seam should be uppermost the solder would tend to flow more or less from the seam down the outside of the can, and thus produce smeared and bad work; and where the soldering is done by immersing the seam in a bath of molten solder, as shown and described in said last-mentioned patent, it is of course essential that the can be placed accurately in the can-carrier chain with its seam downward, in order that the seam, and with it only a small arc of the can-cylinder, be immersed in the molten solder. This requires great care and watchfulness on the part of the attendant, and even then sometimes imperfect work may be done.

It is the principal object of my invention to save the labor of the attendant whose duty it is to place the can-bodies in the soldering-machine can-carrier, and at the same time always deliver the can-bodies into the carrier with their seams turned directly downward, so that the can-bodies need be immersed in the solder bath only to the depth necessary to solder the seam, and thus dispense with the necessity of immersing the can-body in the solder bath to a greater depth in order to compensate for slight inaccuracies in turning the seam of the can-bodies directly downward, as must always be the case where such work is done by hand.

It is also an important object of my invention to provide means for wiping the soldered side seam both upon the inside and the outside of the can, and whereby the wiping may be done immediately after the can-body leaves the soldering bath or device and before the surplus solder adhering to the can becomes set or cold.

Other objects of the present invention are to carry the can-bodies forward positively over the acid and soldering tanks, to evenly distribute the solder throughout the length of the can-body seam, to so apply the acid or flux that it will not touch the inner surface of the can-body, and to provide for the automatic delivery of the soldered can-bodies to a can-heading machine.

In the can-body-forming machines heretofore in use the seam is usually formed at the top of the horn, and where my invention is applied to such machines I provide means for turning the can-body half around before it is conveyed to the soldering device, so that the seam may be directly downward when the soldering and subsequent operation of wiping are being done. If, however, the can-body-forming machine is so arranged that the seam is formed underneath, this semi-turning operation will of course be omitted.

My invention consists, primarily, in the combination, with a can-body-forming machine or its horn, of a side-seam-soldering bath, into which the can-body may pass directly from the body-forming horn and with its seam turned down.

It further consists in the combination, with a body-former horn and the side-seam solderer, of suitable mechanism for turning the body a part of or one-half of a revolution, so that the seam will be underneath at the time the soldering is being done.

It further consists in the combination, with a body-former horn, of a side-seam solderer and an inside wiper secured to and supported by the horn, so that the can-body as it passes off the horn and through the soldering device may at the same time pass around the wiper or wiper-carrying rod, and the can thus be effectually wiped upon the inside without any complicated mechanism and without interfering with the continuous movement of the can-bodies as they are carried along.

The invention further consists in the combination, with a can-body-former horn and suitable mechanism for moving the can-bodies along and off of said horn, of mechanism for revolving the can-body a part of a revolution on said horn and a stop or projection adapted to engage the interlocked side seam to limit the extent of such revolving movement of the can-body on the horn.

It further consists in a can-body-former horn having a longitudinal guide-groove at the lower part of its circumference to receive the side seam and thereby guide the can-body into the side-seam solderer with the seam directly underneath in proper position for soldering.

It further consists in certain novel features in the construction of the side-seam solderer and of its fluxing device, hereinafter fully described.

It also consists in the novel devices and novel combinations of parts or devices herein shown and described, and more particularly pointed out in the claims.

In the accompanying drawings, which form a part of this specification, I have shown one form of machine embodying my invention and that which I deem to be the best form of machine now known to me for practicing my invention. It will of course be understood, however, that the principle of my invention and its generic features may be embodied in many different forms by the skilled mechanic.

As my invention is not limited to any particular kind or form of can-body-forming machine, the body-former horn shown in the drawings may be considered as representing the horn of any well-known type of body-former machines; and as my present invention does not consist in any particular construction of body-former machines, and as the construction of such machines is familiar to those skilled in the art, I have not deemed it necessary to a full understanding of my present invention to herein show or describe the construction of any part of the body-former machine, excepting the horn and the mechanism for moving or advancing the can-body thereon, to which parts only my improvement directly relates.

The horn and can-body-advancing mechanism illustrated in the drawings are parts of the body-former machine shown and described in the patent granted to me May 3, 1888, No. 382,537, and to the same reference is hereby made for a full description of the body-former mechanism. The side-seam-soldering machine may also be of any suitable or well-known construction to those skilled in the art—as, for example, that shown and described in the patent to Norton before referred to.

The particular construction of side-seam-soldering machine which I have devised and which I prefer to use in my combination with the body-former horn is shown in the drawings and comprises, briefly, a mechanism whereby the can-bodies are advanced positively and in a horizontal plane over the acid and soldering tanks, an acid bath, an acid-delivery wick arranged to dip therein, a means for raising the wick to throw it against the can-body seam, this movement taking place just as the leading edge of the can-body comes in line with the forward edge of the acid-wick, a soldering-trough, a soldering-iron arranged in connection therewith and formed with a groove in its upper side, which groove is slightly below the general level of the solder, communication between the solder and the groove being established by means of apertures formed in the iron, and an inclined way up which the can-bodies are moved and from which they are delivered to a chute that leads to a can-heading machine.

In the accompanying drawings similar letters and figures of reference indicate corresponding parts in all the views.

Figure 1 is a side view of that portion of the soldering-machine which is adjacent to the can-body-forming machine. Figs. 2 and 3 are side views of the other end of the machine. Fig. 4 is a central longitudinal sectional elevation of that section of the machine shown in Fig. 1. Fig. 5 is a cross-sectional view taken on line I I of Fig. 4. Figs. 6 and 7 together constitute a central longitudinal sectional view of the forward end of the machine. Fig. 8 is a cross-sectional view taken on line III III of Fig. 7 in the direction of the arrows $a\ a$. Fig. 9 is a cross-sectional view taken on line III III of Fig. 7 in the direction of the arrows $b\ b$. Fig. 10 is a side view of one of the saddles. Fig. 11 is a sectional view taken on line $x\ x$ of Fig. 10. Fig. 12 is a sectional plan view taken on line IV IV of Fig. 1. Fig. 13 is a plan view of the opposite end of the machine. Fig. 14 is a plan view of the solder-trough. Fig. 15 is a central longitudinal sectional view of the trough, the view being taken on line V V of Fig. 14. Fig. 16 is a longitudinal sectional view of the solder-trough, taken on the line VI VI of Fig. 14. Fig. 17 is a cross-sectional view taken on line IX IX of Fig. 13. Fig. 18 is a sectional elevation taken on line X X of Fig. 17. Fig. 19 is a cross-sectional view taken on line XII XII of Fig. 12. Fig. 20 is a cross-sectional view taken on line XI XI of Fig. 12. Fig. 21 is a cross-sectional view taken on line VII VII of Fig. 14. Fig. 22 is a cross-sectional view taken on line VIII VIII of Fig. 14. Fig. 23 is a plan view of the solder-tank, the wick-tube and its supporting-bars being shown in place. Fig. 24 is a perspective view of the wick-tube and its supporting-bars. Fig. 25 is a cross-sectional view taken on line II II of Fig. 6. Fig. 26 is a perspective view of one of the chain-wheels and its recessed arm. Fig. 27 is a side view of the horn. Fig. 28 is a plan view of the same, parts being broken away. Fig. 29 is a cross-sectional view taken on line XI XI of Fig. 27, and Fig. 30 is a cross-sectional view taken on line XII XII of Fig. 27. Figs. 31, 32, and 33 show modified constructions of the can-body turning or reversing device to cause the seam to properly register with the side-seam solderer.

In the drawings, A represents the frame of the machine.

B is the horn of a body-former machine. This horn, as well as the body-former machine of which it forms a part, may be of any suitable or well-known construction—as, for example, that shown and described in any one of the prior patents before referred to or that shown and described in my said former application.

C represents mechanism for advancing the can-bodies along the horn. This mechanism may be of any suitable old and well-known construction—as, for example, that shown and described in said former patents or that shown in my said application. It preferably consists, as shown in the drawings, of one or more reciprocating slides carrying spring-pawls $c$, although any other suitable form of mechanism which may suggest itself to the skilled mechanic may be employed for advancing the can-bodies along and off of the horn.

D represents the side-seam solderer, consisting, preferably, of a molten solder bath or tank over or through which the can-bodies are carried in order to solder their side seams.

E is the can-carrier by which the can-bodies are carried over or through the side-seam solder bath. It consists, preferably, of a link-chain and travels upon a suitable track.

F is the inside wiper, attached by a long rod $f$ to the horn B, so that the can-bodies as they issue from the soldering device will pass around the wiper and be wiped on the inside.

The mechanism or device for giving the can-bodies a partial revolution before they enter the side-seam solderer preferably consists of one or more—ordinarily three—revolving rollers suitably journaled around the horn, so as to bear against the can-body and turn the same on the horn. Any other suitable or equivalent device or mechanism, however, may be employed for reversing the can-body—as, for example, providing the horn with a revoluble section or sleeve, which may be turned half around, or with a wide semi-spiral longitudinal groove for the side seam to fit in, so that the simple advancing movement of the can-body along the horn will turn the same half around. These equivalent constructions of the can-body turning or reversing device are illustrated in Figs. 31, 32, and 33, and other equivalent constructions will readily suggest themselves to the skilled mechanic if it is desired for any reason to modify the construction of this part or device of my combined body-forming and side-seam-soldering machine.

With the can-body turning device first above described the stop $g$ operates to arrest the revolving movement of the can-body by the seam of the can-body striking against said stop. With a different construction of the can-body-turning device the stop may be differently arranged or entirely omitted, the turning mechanism itself constituting a stop to cause the seam to register properly with the groove $b$ in the final section of the horn or with the side-seam solderer, which the can-body next enters as it further advances.

I will now proceed to describe the construction of my combined body-former and side-seam-solderer machine in detail as I prefer to build the same, the same also embodying certain improvements which are specifically set forth in the claims.

In Figs. 1 and 4 of the drawings above referred to I have shown a portion of the can-body-forming machine described in my application, Serial No. 243,496, hereinbefore referred to, such portion comprising the end section of the horn B, upon which the cans are formed, the parts operating in connection with such horn-section being shown in Fig. 1. To the extreme end of the horn B there is connected an auxiliary horn-section 11, the sides of which are recessed at 12 to receive feeding-slides C, which slides are provided with spring-pressed tongues or pawls $c$, the slides being made integral with the feeding-slides of the can-body-forming machine or rigidly connected thereto.

The main portion of the horn B is preferably of less diameter than the section 11, and the under side of this section 11 is cut away at 15, as shown best in Fig. 29, a stop-block $g$ being secured to the flat surface formed by this cut just at one side of the center line of the horn. The vertical face of this block $g$ registers with a groove $b'$, formed in the auxiliary section 11 of the horn B, said section being of a diameter equal to that of the internal diameter of the can-body. In connection with the horn B, I arrange a yoke 18, one end of which is supported by a wrist-pin 19, carried by a crank-arm 20, said arm being rigidly connected to a horizontal shaft 21, mounted at one side of the can-body-forming machine, the other end of the yoke being supported by a box 22, which rides in a slot 23, formed in the yoke, said box being engaged by a wrist-pin $19^a$, carried by a crank-arm $20^a$, that is connected to a horizontal shaft $21^a$. The shafts 21 and $21^a$ are revolved in the direction of the arrows shown in connection therewith in Fig. 5.

To a frame 24, which is connected to the frame 25 of the can-body-forming machine, there are studded three rollers 26, 27, and 28, and these rollers are engaged eccentrically by studs 29, carried by the yoke 18. The peripheral faces of the rollers 27 and 28 are cut away at $a$, the uncut portions being equal in circumferential length to about one-half of the outer circumference of the can-body.

The mechanism above described is employed to reverse the position of the can-bodies, the seams of said bodies being upon the upper side of the horn as the bodies are fed forward to the section 11 of the horn B, this feeding forward being brought about by means of a reciprocating motion which is imparted to the slides 13, as described in my patent, No. 382,537, hereinbefore referred to; but when the can-body reaches the horn B the rollers 27 and 28 will bear thereon, and as these rollers are turned in the direction of the arrows shown in connection therewith by the action of the yoke 18 the can-bodies will be moved half-way around the horn, the movement continuing until the seam $b$ strikes against the verical face of the block $g$, the seam by this movement being brought in register with the groove $b'$ of the horn-section 11, the can-body being forced forward onto said section 11 by the next forward movement of the feeding-slides.

The upper portion of the forward end of the section 11 is cut away on a double angle, as shown at 14, (see Fig. 27,) and above the inclined faces formed by this cut there is mounted a transverse shaft 30, which carries two chain-wheels 31, the shaft being supported by a frame 32, that is connected to a masonry support 33, upon which the solder-tank D is mounted, as will be hereinafter explained. Directly upon the solder-tank D, I place tracks 34, and above these tracks I arrange upper tracks 35, said upper tracks being formed of angle-irons, as best shown in Figs. 17, 19, and 20. These upper tracks are supported at one end by arms 36, to which they are bolted by bolts 37, the arms 36 being mounted on the shaft 30, the other end of the tracks being supported by blocks 38, that are mounted on a shaft 39, which is supported by brackets 41, that are secured to the opposite end of the solder-tank D.

Beyond the tracks 34 and 35 there are auxiliary upwardly-inclined tracks 42 and 43, which extend to within a short distance of a third transverse shaft 44, which carries chain-wheels 45. Chains 46 are passed about the wheels 31 and 45, which chains at regular intervals carry flanged wheels or rollers 47, the axles 48 of said wheels or rollers extending from chain to chain and forming the pintle by which the adjacent links are connected. Immediately in advance of each of the shafts or axles 48 I mount saddles 49, which are connected to the two chains, these saddles being formed so that they will fit snugly to the peripheral faces of the can-bodies. The treads of the rollers or wheels 47 ride upon the tracks 34, 35, 42, and 43.

To the chain-wheels 31 and 45 I connect arms 50, the ends of which are recessed to receive the roller-axles 48, this arrangement being adopted in order that a positive motion may be imparted to the chains 46 when a rotary motion is imparted to the shaft 30, this motion of the shaft being secured by means of a chain (not shown in the drawings) which runs in engagement with a chain or sprocket wheel 51, that is carried by the shaft 30, the chain so running in engagement with the wheel 51 being driven by another chain-wheel that is arranged in connection with the can-body-forming machine, the rotation of the shaft 30 being so timed that one of the shafts 48 will descend behind a can-body just as said body is forced forward to a position to allow for the downward passage of the shaft or axle.

In the frame 32 there is formed a tank 52, which extends laterally beneath the upper facing-plate of the frame, as shown at 53, the facing-plate, however, being formed with a central aperture 54 and with other apertures $54^a$ at either side of the tracks 34. A wick-tube 55 extends upward through the aperture 54, this tube being supported by bars 56, which said bars are connected to levers 57, that are pivotally connected to the tracks 34, the connection between the bars 56 and the levers 57 being established by eyebolts 58, which extend upward from the bars 56 through the apertures $54^a$, these eyebolts being pivotally connected to the levers.

The rearwardly-extending ends of the levers 57 are pivotally connected to bars 59, that are formed with inclined ends 60, these bars 59 being mounted directly above the tracks 34 in position such that the treads of the approaching wheels or rollers 47 will bear against their inclined ends, the arrangement being such that as a pair of the wheels or rollers approach the bars the bars will be raised, and in rising will move the levers 57 in the direction of the arrow shown in Fig. 1, this movement being so timed that the wick 61, arranged within the wick-tube 55, will be moved upward to a position so that it will bear against the can-seam just as the forward edge of the can comes in register with the forward edge of the wick. By the above-described arrangement I guard against the possibility of any acid being deposited upon the inner face of the can-body, it being understood that the lower end of the wick 61 dips within a supply of acid that is placed in the tank 52, and that such acid will by capillary attraction be drawn to the upper end of the wick, a portion of the acid being transferred therefrom to a can-body seam at each throw of the wick-tube.

At the time when the can-bodies are above the acid-tank they are supported by upwardly-extending flanges 63, that are formed upon the upper facing-plate of the frame 32, and as the cans move forward they are carried upon a soldering-iron 64, which is mounted upon a partition 65, that extends across a central trough 66, mounted within the solder-tank 40. At one or both sides of the trough 66 there are troughs 67, and if two of these troughs be employed they are connected by passages 68, that extend beneath the trough 66. At one end of the soldering-trough D, I arrange pockets 69, in the upper walls of which pockets there are formed apertures 70, which establish communication between the troughs 67 and the pockets 69, the flow through these apertures being regulated by plug-valves 71, the stems of which are threaded to engage with threaded apertures formed in flanges 72, which extend over the lower ends of the troughs 67, the pockets 69 communicating directly with the trough 66, as shown best, probably, in Fig. 22. The soldering-iron 64 is in the form of an inverted V, the apex of the iron being cut away to form a trough 2, which trough is placed in communication with the trough 66 by means of a series of apertures 3, the partition 65 being longitudinally slotted, as shown at 4. (See Figs. 20 and 22.)

Beyond the forward end of the trough 66 and the soldering-iron 64 there is a trough 73, to which all excess of solder flowing from the soldering-iron passes, the flow of solder being as indicated by the arrows in Fig. 14. At one side of the trough 73 there is mounted a pump 80, which may be of any desired construction, the only requirement being that the pump shall act to raise the solder over the wall or partition 74 and into one of the troughs 67. The specific form of pump illustrated in the drawings will be hereinafter described.

From the above description it will be seen that solder passing from the pockets 69 into the troughs 66 will flow thence through the apertures 3 and into the trough 2 of the soldering-iron 64, providing that the level of the solder within the troughs 67 be slightly higher than that of the top of the soldering-iron, so that as the cans are advanced over the soldering-iron their seams will be drawn through a bath of molten solder held by the trough 2, the solder within the solder-tank D being melted by combustion carried on within a fire-chamber that is inclosed by the masonry 32, or any other means for heating the solder might be employed.

In order that all surplus solder may be wiped from the inner faces of the can-bodies, I provide a wiper F, which is secured to the extending end of a rod $f$, said rod being connected to the lower inclined face of the forward end of the horn 11, as is clearly shown in Fig. 4. The outer face of the can-body is wiped by a circular wiping disk or wheel 92, that is mounted on a shaft 93, said shaft being journaled beneath the tracks 42. This shaft 93 carries a pulley 94, in connection with which there is arranged a driving belt or cord 95, that runs in engagement with a driving-wheel 96, which wheel is mounted on a shaft 97, which carries a pulley 98, that is driven by a belt that runs in contact with a pulley carried by a counter-shaft, as will be readily understood, or any other means may be employed for driving the wiping-disk 92.

The wipers F and 92 are preferably made of asbestus. They may, however, be made of any other suitable material.

After the can-bodies leave the soldering-iron they pass upon two rods 99, which rods extend upward in a plane parallel with that of the tracks 42 and 43 to a point somewhat below the chain-wheels 45, the upper ends of the rods 99 being supported by a block 100, beyond which block the rods are bent downward, as shown in Figs. 3, 7, and 8.

When the machine above described is in operation, the chains 46 become heated and consequently expand, and in order that a proper tension may at all times be maintained I mount the shaft 44 in adjustable bearings 102, said bearings being connected to a screw 103, which extends outward through the upper cross-piece 104 of the upper frame-section 105, the screw being engaged by a nut 106, so that by turning the nut in a proper direction the bearings may be moved up toward the cross-piece 104, whereby the slack caused by the expanding of the chain will be taken up.

The pump (shown in detail in Fig. 18) consists of a cylinder 110, in which there is mounted a piston 111, formed with an annular groove 112, which groove is entered by the bifurcated end of a lever 113, said lever being fulcrumed on a standard 114, connected to the solder-trough. A connecting-rod 116 extends from the lever 113 to a crank-arm 115, that is keyed to the inner end of the shaft 97, so that as said shaft revolves a reciprocating motion will be imparted to the piston 111. A plunger 117 fits snugly within a central bore formed in the piston 111, the lower end of the plunger carrying a valve-head, which, as the piston is lowered, will be carried against a valve-seat 118, which surrounds a port 119, formed in the cylinder-head 120 and leading to the overflow-receptacle 73, the plunger being carried from the seat as the piston moves upward, the upward movement of the plunger, however, being limited by a set-screw 121. At one side of the cylinder 110 there is a discharge-port 122, in connection with which there is arranged a check-valve 123.

In operation solder is drawn within the cylinder by the suction caused by the upward movement of the piston, the frictional contact between the piston and plunger being sufficient to carry the plunger upward with the piston until the set-screw 121 checks the movement of the plunger, the piston continuing its movement to the full up stroke; but when the piston is carried downward the plunger is also moved downward until its lower end rests on the seat 118, after which the continued downward movement of the piston will force the solder through the port 122, past the valve 123, and up over the wall or partition 74 into the trough 67. From the above description it will be seen that by turning the set-screw 121 the action of the pump may be so regulated as to deliver solder to the tank 67 in any desired quantity.

Although I have spoken of the soldering-iron as an entirety, I prefer in practice to make such iron in sections, as shown at o p q, and, although I have described and illustrated a specific form of soldering-iron and solder-tank, I desire it to be distinctly understood that any form of iron having a grooved or channeled upper face located beneath the general level of the solder, which grooved or channeled face is placed in communication with the solder, would be within the terms of my invention.

In the modification shown in Fig. 33 the spiral guide-groove for turning the can-body half a revolution as it is being advanced along the horn is made wide and deep enough and of a sufficiently gradual curve to accommodate the straight side seam of the can-body. The width and depth and curvature of this spiral guide-groove will of course depend upon the length of the can-body being operated upon.

By the expression "can-forwarding mechanism" as employed in claims 27, 28, and 29 I intend to include, generically, mechanism that will convey the cans from the horn through and over the solder bath. I do not restrict myself in said claims to the use of two can-body carriers or conveyers, one for delivering the can-body from the horn and another for conveying it over the soldering device, as it is evident that this work may be performed by a single carrier or even by a greater number of carriers than two.

Having thus fully described my invention, I claim as new and desire to secure by Letters Patent—

1. A soldering-iron formed with a grooved upper face and with apertures leading from said groove.

2. A soldering-iron consisting, essentially, of an inverted-V-shaped iron formed with a groove in its apex and with a number of apertures leading from said groove.

3. A soldering-iron made up of a series of abutting sections, each formed with a grooved upper face and with apertures leading from its groove, as and for the purpose stated.

4. A soldering-iron made up of a series of inverted-V-shaped abutting sections, each formed with a grooved apex and with apertures leading from the groove, as and for the purpose stated.

5. The combination, with a solder-tank, of a soldering-iron formed with a grooved upper face and with apertures leading therefrom, the said upper face being slightly below the general solder-level.

6. The combination, with a solder-tank, of a soldering-iron formed with a grooved upper face and with apertures leading from the groove, and a means, substantially as described, for regulating the flow of solder to the iron, as and for the purpose stated.

7. The combination, with a solder-tank formed with a side trough, a partitioned central trough, and an overflow-receptacle, of a soldering-iron formed with a grooved upper face and with apertures extending through the iron from said groove, the soldering-iron being mounted upon the partition of the central trough, the lower portion of said partitioned central trough communicating with said side trough, substantially as described.

8. The combination, with a solder-tank formed with a side trough, a partitioned central trough, and an overflow-receptacle, of a soldering-iron mounted upon the partition of the central trough and formed with a grooved upper face and with apertures leading from said groove and through the iron, and a pump mounted in connection with the overflow-receptacle and arranged to discharge into the side tank, the lower portion of said partitioned central trough communicating with said side trough, substantially as described.

9. The combination, with a solder-tank formed with a side trough, a partitioned trough communicating with the side trough, and an overflow-receptacle, of a soldering iron having apertures through it mounted on the partition of the partitioned trough, and a pump mounted in connection with the overflow-receptacle and arranged to deliver solder therefrom to the side trough, the lower portion of said partitioned central trough communicating with said side trough, substantially as described.

10. The combination, with a solder-tank formed with communicating side troughs, a partitioned central trough communicating with the side troughs, and an overflow-receptacle arranged to receive the discharge from above the partition of the central trough, of a soldering-iron having apertures through it mounted above an opening or slot formed in the central trough-partition, and a pump mounted in connection with the overflow-receptacle and arranged to discharge into one of the side troughs, the lower portion of said partitioned central trough communicating with said side trough, substantially as described.

11. The combination, with a solder-tank formed with communicating side troughs, a partitioned central trough communicating with the side troughs, and an overflow-receptacle arranged to receive the discharge from above the partition of the central trough, of a soldering-iron having apertures through it mounted above an opening or slot formed in the central trough-partition, a pump mounted in connection with the overflow-receptacle and arranged to discharge into one of the side troughs, and a means, substantially as described, for regulating the flow of solder from the side troughs to the lower portion of the central trough, the lower portion of said partitioned central trough communicating with said side trough, as and for the purpose stated.

12. The combination, with a solder-tank formed with a side or supply trough, a partitioned central trough, an overflow-receptacle, and a pocket, of a valve mounted in connection with an aperture formed in one of the pocket-walls, a soldering-iron having apertures through it mounted above a slot or opening formed in the central trough-partition, and a pump arranged to deliver solder from the overflow-receptacle to the side or supply trough, said pocket communicating with said side trough and with the lower portion of said central trough, substantially as described.

13. In a can-soldering machine, the combination, with an acid-tank, of a wick-tube and a means, substantially as described, for raising said tube, as and for the purpose stated.

14. In a can-soldering machine, the combination, with an acid-tank, of a wick-tube, a frame upon which said tube is mounted, levers to which said frame is connected, incline-faced bars connected to the levers, endless carrier-chains, rollers or wheels carried by the chains, and tracks upon which the wheels or rollers ride, the incline-faced bars being mounted in the paths of the wheel or roller treads, substantially as described.

15. In a can-soldering machine, the combination, with a horn, of a frame, rollers studded to the frame, a yoke, studs carried by the yoke and engaging the rollers, and a means, substantially as described, for imparting a rotary motion to the yoke, as and for the purpose stated.

16. In a can-soldering machine, the combination, with a horn, of a frame through which the horn passes, rollers studded to the frame, the peripheral faces of the upper rollers being partially cut away, a yoke, studs carried by the yoke and engaging the rollers, and a means, substantially as described, for imparting a rotary motion to the yoke, as and for the purpose stated.

17. In a can-soldering machine, the combination, with a horn, of a frame mounted about the horn, rollers studded to the frame, the peripheral faces of the upper rollers being partially cut away, a yoke, studs carried thereby and engaging the rollers, revoluble shafts provided with crank-arms, a connection between one of the crank-arms and the yoke, and a connection between the other crank-arm and a box mounted to slide in a slot formed in the yoke, substantially as described.

18. In a can-soldering machine, the combination, with a horn formed with sections of different diameters and with a groove in the under side of the larger section, of a stop-block connected to the under side of the smaller section, a fixed frame through which the horn passes, rollers studded to the frame, the peripheral faces of the upper rollers being partially cut away, a yoke, studs carried by the yoke and engaging the rollers, and a means, substantially as described, for imparting a rotary motion to the yoke, as and for the purpose stated.

19. In a can-soldering machine, the combination, with an acid-tank, of a wick-carrying tube mounted therein, a can-advancing mechanism, substantially as described, and a means, substantially as described, for throwing the wick against the can-body seam as the forward edge of the can-body comes in register with the forward edge of the wick.

20. In a can-soldering machine, the combination, with a horn, of a rod connected thereto, a wiper connected to the end of the rod, a solder-tank over which the rod extends, and a means, substantially as described, for advancing the can-bodies, as and for the purpose stated.

21. In a can-soldering machine, the combination, with a track or way, of endless chains, cross-bars extending from chain to chain, and saddles carried by the chains in advance of the cross-bars, substantially as described.

22. In a combined can-body-forming and side-seam-soldering machine, the combination, with a can-body-former horn, of a side-seam-soldering device and mechanism for delivering the can-body to the soldering device from the horn with its seam turned down, so that the soldering may be done from below, substantially as specified.

23. The combination, with a can-body-former horn, of a side-seam solderer and means for moving the can-body along from the horn over the solderer, substantially as specified.

24. The combination, with a can-body-former horn, of a side-seam-soldering device, mechanism for giving the can-body a partial revolution, so that it will be delivered to the solderer with its seam turned down, and means for moving the can-body along from the horn over the soldering device, substantially as specified.

25. The combination, with a can-body-former horn, of a side-seam solderer and an inside wiper secured to the horn and means for moving the can-body along from the horn over the solderer, substantially as specified.

26. The combination, with a can-body-former horn having a longitudinal groove on its under side at the end section thereof for the side seam, of a side-seam solderer into which the can-bodies are delivered directly from the horn with their seams turned down, so that they will be soldered from below, and means for moving the can-body along from the horn over the solderer, substantially as specified.

27. In a combined can-body-forming and side-seam-soldering machine, the combination, with a can-body-former horn, of a side-seam solder bath and can-forwarding mechanism for conveying the cans from the horn through and over the solder bath, substantially as specified.

28. In a combined can-body-forming and side-seam-soldering machine, the combination, with a can-body-former horn, of a side-seam solder bath and can-forwarding mechanism for conveying the cans from the horn through and over the solder bath, and an inside wiper secured to the horn, substantially as specified.

29. In a combined can-body-forming and side-seam-soldering machine, the combination, with a can-body-former horn, of a side-seam solder bath, a device for turning the can-bodies a partial revolution, and can-forwarding mechanism for conveying the cans from the horn through and over the solder bath, substantially as specified.

30. In a combined can-body-forming and side-seam-soldering machine, the combination, with a can-body-former horn, of mechanism for advancing the can-body along the same, a side-seam solderer, and a can-carrier device for conveying the cans through and over the solderer, said side-seam solderer being beneath the path of the can-carrier, substantially as specified.

31. The combination, with the can-body-forming machine having a horn around which the can-body is formed and means for advancing the can-body along the horn, of a side-seam-soldering machine having a solder bath or device for soldering the seam from below, and means for moving the can-body along over said soldering bath or device, substantially as specified.

32. In a combined can-body-forming and side-seam-soldering machine, the combination, with a can-body-former horn, of mechanism for advancing the can-body along the same, a device for turning the can-bodies, a side-seam solder bath, and a can-carrier for conveying the cans over the solder bath, substantially as specified.

33. In a combined can-body-forming and side-seam-soldering machine, the combination, with a can-body-former horn, of can-forwarding mechanism and a heated soldering-iron beneath the path of the can-conveyer mechanism, over which the cans are carried by the conveyer mechanism from the horn, substantially as specified.

34. In a combined can-body-forming and side-seam-soldering machine, the combination, with a can-body-former horn, of can-forwarding mechanism and a heated soldering-iron over which the cans are carried by the conveyer mechanism from the horn, said heater-iron having holes or perforations through which molten solder is delivered to the seam from below, substantially as specified.

In testimony whereof I affix my signature in presence of two witnesses.

FRANK M. LEAVITT.

Witnesses:
D. JUDGE,
T. C. B. PAGE.